US005751533A

United States Patent [19]
Kaczmarek

[11] Patent Number: 5,751,533

[45] Date of Patent: May 12, 1998

[54] CUP AND DIODE ASSEMBLY FOR OVERVOLTAGE PROTECTORS AND COMMUNICATIONS LINES

[75] Inventor: Richard T. Kaczmarek, Park Ridge, Ill.

[73] Assignee: Reltec Corporation, Cleveland, Ohio

[21] Appl. No.: 595,278

[22] Filed: Feb. 1, 1996

[51] Int. Cl.$^6$ .......... H02H 3/22

[52] U.S. Cl. .......... 361/119; 361/124; 361/127

[58] Field of Search .......... 361/117, 120, 361/124, 126, 127, 111, 119; 337/28, 31, 34

[56] References Cited

U.S. PATENT DOCUMENTS

| | | | |
|---|---|---|---|
| 3,587,021 | 6/1971 | Baumbach | 337/32 |
| 3,743,888 | 7/1973 | Baumbach | 317/16 |
| 3,755,715 | 8/1973 | Klayum et al. | 317/62 |
| 3,794,947 | 2/1974 | Baumbach | 337/32 |
| 3,818,271 | 6/1974 | Baumbach | 317/16 |
| 3,849,750 | 11/1974 | Baumbach et al. | 337/32 |
| 3,886,411 | 5/1975 | Klayum | 317/62 |
| 4,013,927 | 3/1977 | Gilberts | 361/119 |
| 4,128,855 | 12/1978 | Gilberts | 361/119 |
| 4,168,515 | 9/1979 | Baumbach | 361/124 |
| 4,208,694 | 6/1980 | Gilberts | 361/119 |
| 4,241,374 | 12/1980 | Gilberts | 361/124 |
| 4,321,649 | 3/1982 | Gilberts | 361/119 |
| 4,325,100 | 4/1982 | Baumbach | 361/119 |
| 4,876,626 | 10/1989 | Kaczmarek | 361/119 |
| 5,172,296 | 12/1992 | Kaczmarek | 361/119 |
| 5,195,015 | 3/1993 | Kaczmarek | 361/119 |
| 5,341,270 | 8/1994 | Kaczmarek | 361/119 |

*Primary Examiner*—Ronald W. Leja
*Attorney, Agent, or Firm*—Trexler, Bushnell, Giangiorgi & Blackstone, Ltd.

[57] ABSTRACT

An arrester assembly which retains all the components thereof in an assembled condition is disclosed. The arrester assembly can be handled as an individual subassembly for use in a line protector. The arrester assembly includes a cup which has a base, at least one wall, and an open end. A sleeve is retained within the cup by an interference fit between the outside of the sleeve and the inside surface of the cup. An arrester element having a first face and a second face is retained within the sleeve with the first face in conductive contact with the base of the cup. A solder contact in the form of an elongated beam is positioned within the sleeve in abutting contact with the second face of the arrester element. The beam includes engaging structures which are forced past an inner ridge on an internal surface of the sleeve for retaining the beam in position in the sleeve. As such, the components of the assembly are retained in engagement allowing the arrester assembly to be handled as a single subassembly for use in a line protector.

20 Claims, 4 Drawing Sheets

FIG. 3
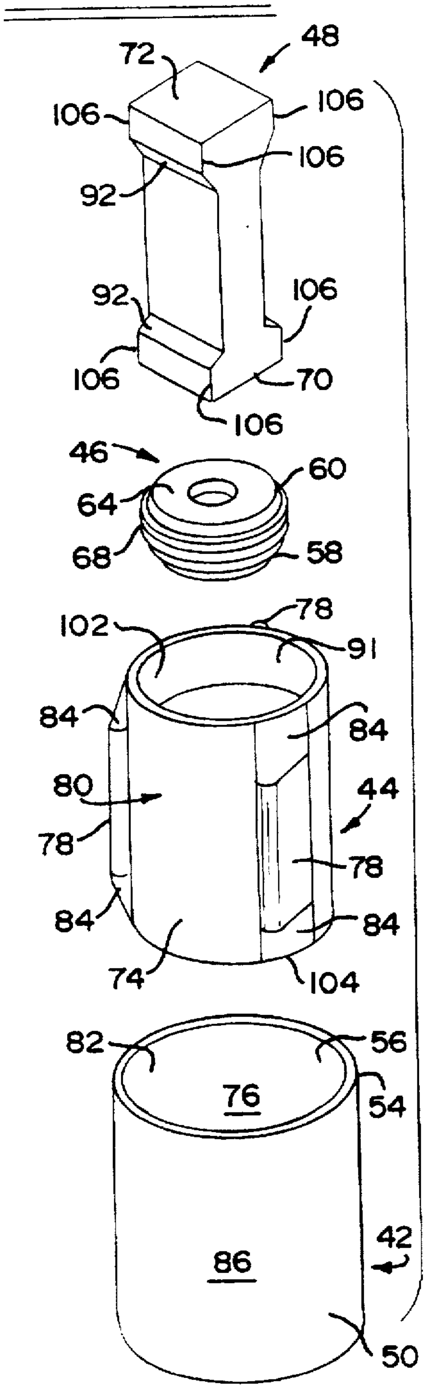
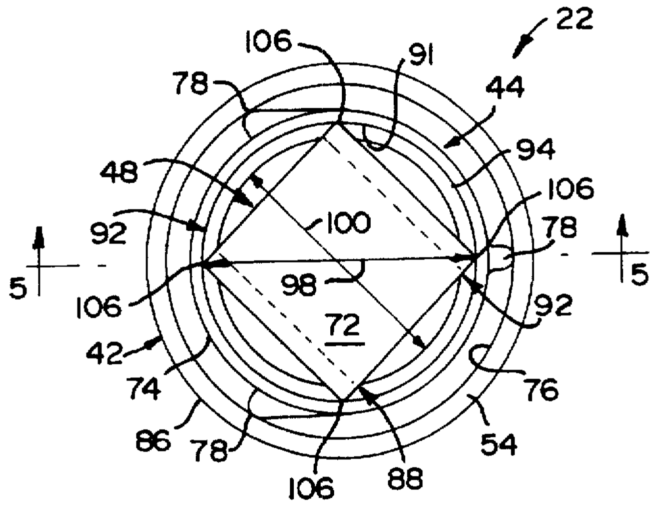
FIG. 4
FIG. 5
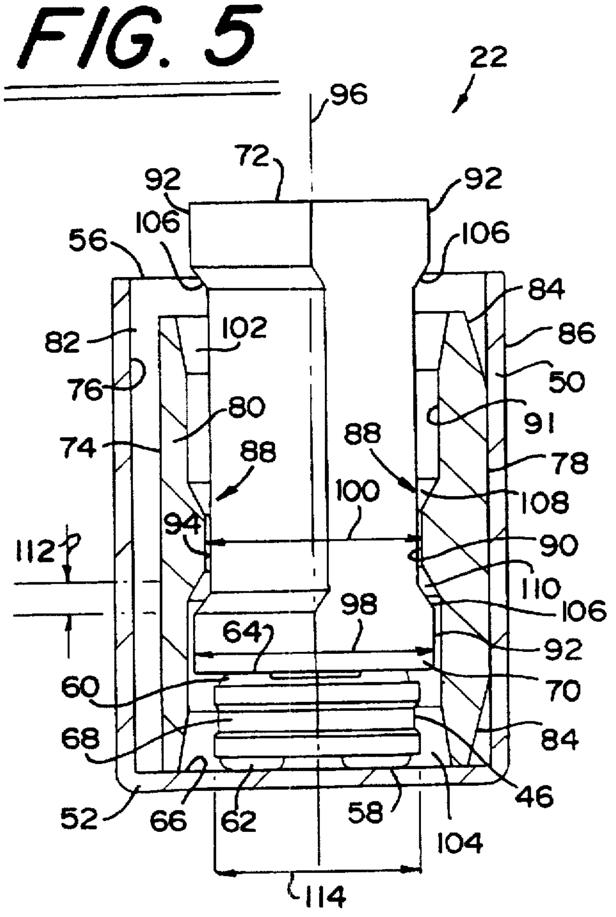

FIG. 6
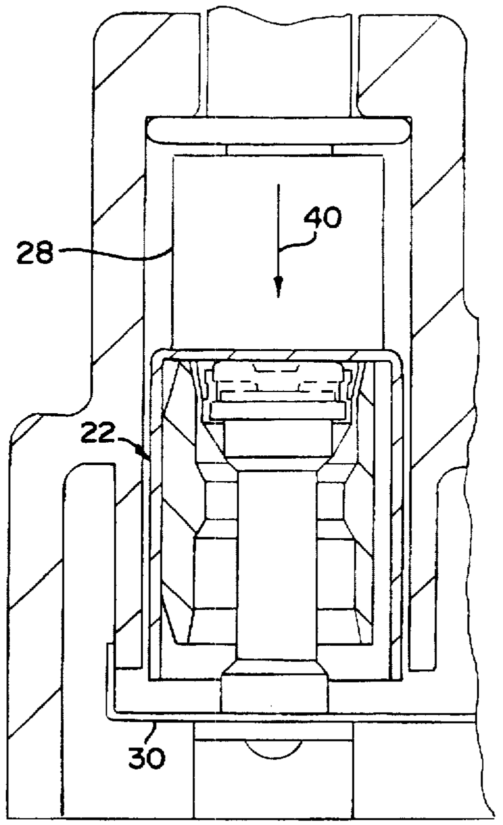
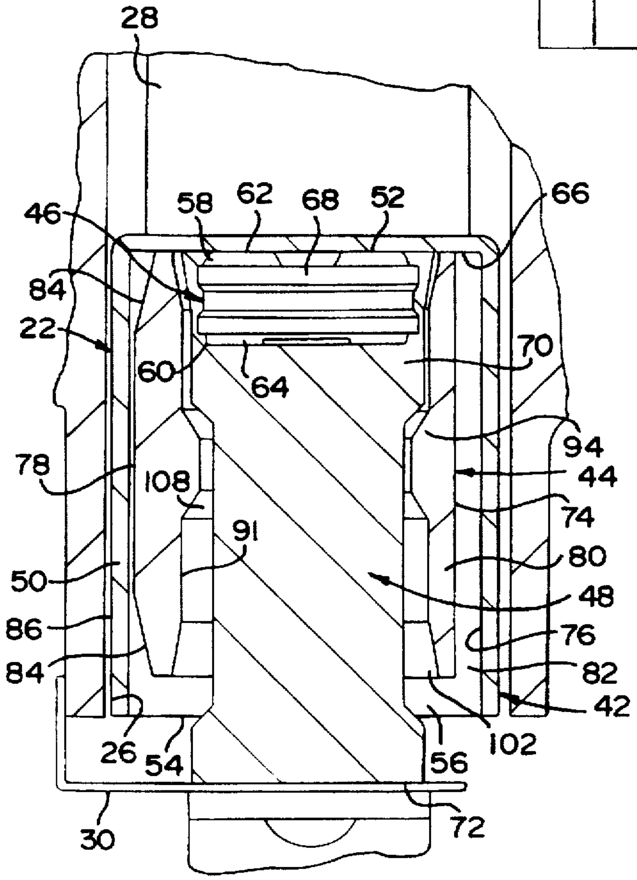
FIG. 7

CUP AND DIODE ASSEMBLY FOR OVERVOLTAGE PROTECTORS AND COMMUNICATIONS LINES

BACKGROUND

The present invention relates to electrical protector assemblies and, more particularly, an electrical protector assembly which uses a novel cup and arrester assembly for use in such a protector.

A variety of electrical protector assemblies are available. Line or station protectors are used to provide communications equipment with protection against voltage surges or overvoltages on the line to which they are connected. Such protectors generally employ a surge arrester for each of the two wires, tip (T) and ring (R), in the telephone line to be protected.

Recently, an air-gap arrester has been used consisting of a pair of carbon electrodes which are held in a spaced-apart, facing condition across a small air gap. Upon the occurrence of an overvoltage or surge voltage on the protected line, the voltage causes arcing across the air gap and consequent grounding of the overvoltage condition. In this regard, one of the carbon electrodes is in circuit with the ground and the other is in circuit with the line to be protected. One example of such an arrester (often referred to as a carbon arrester) is illustrated in U.S. Pat. No. 3,743,888, issued Jul. 3, 1973, which is assigned to the assignee of the present invention.

Another type of surge arrester which has been used in station protectors in the recent past is a gas tube surge arrester. One example of a station protector which uses a gas tube overvoltage arrester is shown in U.S. Pat. No. 4,241,374, issued Dec. 23, 1980, and which is assigned to the assignee of the present invention. In the '374 patent, a gas tube arrester assembly is placed inside of a conductive cap which is capable of being threaded into a well of a station protector block which holds multiple identical arresters. The gas tube member of the assembly is housed within a conductive cup. The gas tube arrester assembly is used within a terminal block which is constructed for establishing a ground connection with the threaded conductive cap of the assembly. The gas tube is generally cylindrical in form having electrodes at its opposite axial ends.

Solid state devices are now available for use as overvoltage arresters. The solid state devices replace the gas tubes and carbon arc arresters to protect communications equipment. A device which includes a solid state overvoltage arrester element is shown in U.S. Pat. No. 5,341,270, issued Aug. 23, 1994, and assigned to the assignee of the present invention.

All of the arrester assemblies include components which are rather small. For example, the devices shown in the '270 patent include an arrester element retained in a cup with a sleeve, a spring, and a cap. Prior art designs relied on these elements being placed in the cup prior to assembly in a protector housing. The device as shown in the '270 patent makes an improvement on this by crimping the sleeve and cup in order to retain the components in assembly. However, the step of crimping the assembly requires precision forming, requiring additional time, and may result in incorrect crimping. If the cup is incorrectly crimped, the assembly may be damaged thereby requiring replacement with another assembly. This could result in increased cost, material waste, and manufacturing time.

OBJECTS AND SUMMARY

A general object of the present invention is to provide an arrester assembly which is quickly and easily assembled.

Another object of the present invention is to provide an arrester assembly which is assembled by aligning and stacking components and which captively retains the components without the use of additional hardware requiring alteration of the structure of the assembly.

A further object of the present invention is to provide an arrester assembly which provides alternate mechanisms for shunting across an arrester element.

Briefly, and in accordance with the foregoing, the present invention envisions an arrester assembly which retains all the components thereof in an assembled condition. The arrester assembly can be handled as an individual subassembly for use in a line protector. The arrester assembly includes a cup which has a base, at least one wall, and an open end. A sleeve is retained within the cup by an interference fit between the outside of the sleeve and the inside surface of the cup. An arrester element having a first face and a second face is retained within the sleeve with the first face in conductive contact with the base of the cup. A solder contact in the form of an elongated beam is positioned within the sleeve in abutting contact with the second face of the arrester element. The beam includes engaging structures which are forced past an inner ridge on an internal surface of the sleeve for retaining the beam in position in the sleeve. As such, the components of the assembly are retained in engagement allowing the arrester assembly to be handled as a single subassembly for use in a line protector.

BRIEF DESCRIPTION OF THE DRAWINGS

The organization and manner of the structure and function of the invention, together with further objects and advantages thereof, may be understood by reference to the following description taken in connection with the accompanying drawings, wherein like reference numerals identify like elements, and in which:

FIG. 3 is an enlarged, exploded perspective view of the arrester assembly showing an axially aligned cup, arrester element, sleeve, and elongated solder contact;

FIG. 4 is an enlarged, top plan view of an arrester assembly as taken along line 4—4 in FIG. 2;

FIG. 5 is a partial fragmentary, cross-sectional, side elevational view of the arrester assembly generally taken along line 5—5 in FIG. 4;

FIG. 6 is an enlarged, partial fragmentary, cross-sectional, side elevational view of the arrester assembly retained in a protector housing structure of the line protector as shown in FIG. 1;

FIG. 7 shows one result of the melting of the solder contact in which molten solder has flowed over the arrester element bridging the space between two opposed electrodes of the arrester element and the base of the cup.

DESCRIPTION

Figure 2:
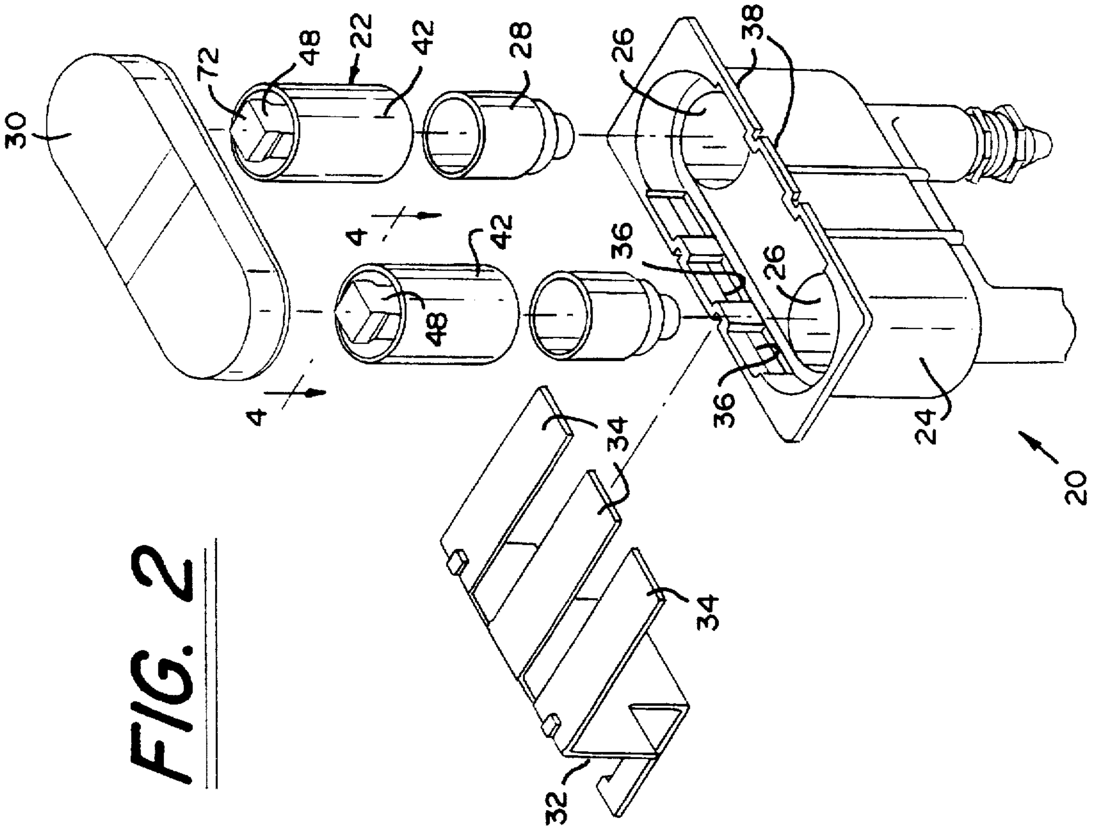
FIG. 2 is an inverted perspective view of the line protector shown in FIG. 1 which has been exploded to show assembly of the line protector.

While the present invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

A line protector 20 is shown in FIG. I and includes an arrester assembly 22 of the present invention. The line protector 20 has a housing 24 defining a pair of side-by-side nests 26 therein for receiving the arrester assembly 22 and a biasing structure 28 which is illustrated herein as a volute spring. The arrester assembly 22 and the corresponding springs 28 are retained in the nests 26 by a cap 30 which is retained in the protector housing 24 by a retaining clip 32. The retaining clip 32 has a plurality of fingers 34 which extend through corresponding clip slots 36, 38 in the housing thereby retaining the cap 30 against the arrester assembly 22.

Figure 1:
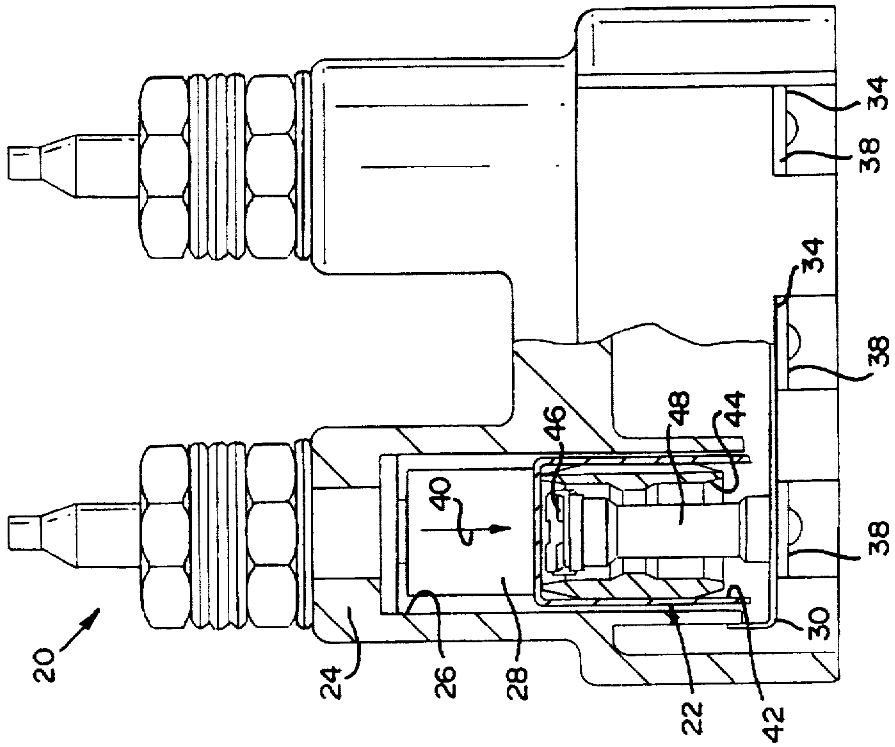
FIG. 1 is a partial fragmentary, cross-sectional, side elevational view of a line protector including an arrester assembly of the present invention.
Figure 8:
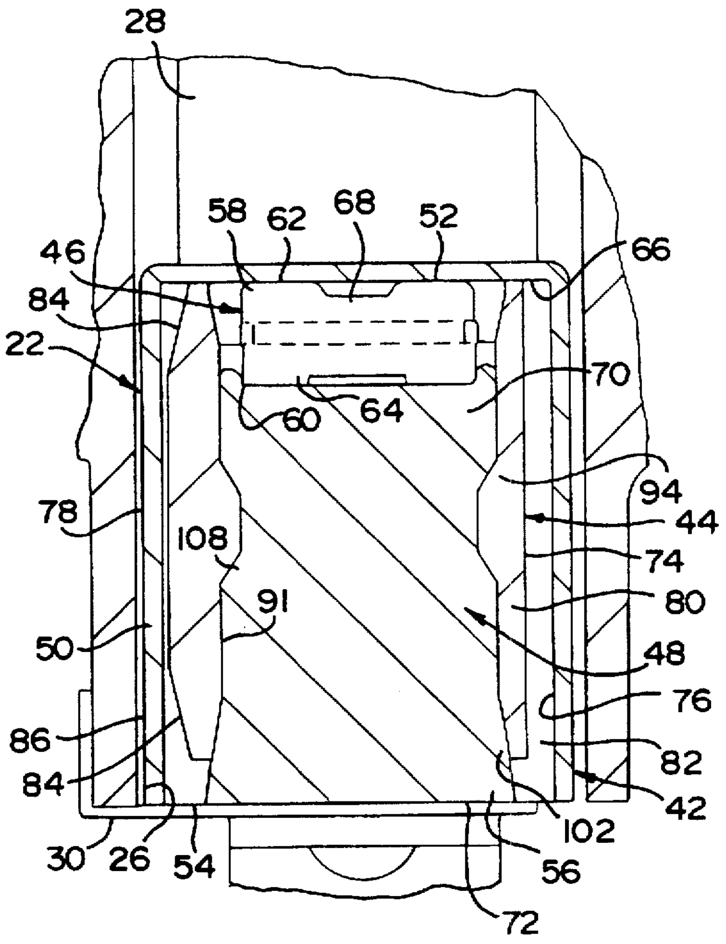
FIG.8 is a second condition in which the solder contact is melted thereby reducing the overall height of the arrester assembly and allowing the conductive cup to contact a conductive cap portion of the line protector assembly.

With further reference to FIGS. 1 and 2, the spring 28 is positioned against the arrester assembly 22 to maintain a biasing force (as indicated by force arrow 40) on the arrester assembly 22 positioned between the cap 30 and the spring 28. With further reference to FIGS. 3–5, the arrester assembly 22 includes a cup 42, a sleeve 44, an arrester element 46, and an elongated meltable conductive contact 48. The cup 42 is shown as a hollow cylindrical structure having at least one wall 50 and a base 52 with an upper rim 54 of the wall forming an open end 56. A conductive material is used to form the cup 42 in order to provide a conductive contact with the arrester element 46. Additionally, as shown in FIG. 8 and described in greater detail hereinbelow, the conductive cup 42 may provide a circuit by contacting the cap 30 which is also formed of a conductive material. Additionally, while the cup 42 is shown in a cylindrical form herein other shapes of the cup are envisioned and may be used as necessary, depending on the particular requirements of the line protector or application.

The arrester element 46 is a solid state device which has a generally cylindrical or disk-like shape and bipolar symmetry. Opposite ends of the arrester element 46 define a first electrode 58 and a second electrode 60. The first and second electrodes 58, 60 have a first conductive face 62 and a second conductive face 64. The first conductive face 62 is positioned against a conductive surface 66 of the base 52 of the cup 42. A nonconductive plastic band 68 separates the first and second electrodes 58, 60.

Under normal operating conditions the arrester element 46 operates to provide overload protection. The arrester element 46 includes a solid state device in the form of a diode which is sandwiched between the first and second electrodes 58, 60. The plastic tube or band 68 is wrapped around the outside of the arrester element 46 overlapping a portion of the first and second electrodes 58, 60 to seal moisture out of the element. If the diode in the arrester element does not function properly there are fail safe mechanisms which provide overload protection.

The elongated meltable conductive contact 48 is in the form of an elongated beam. The elongated contact 48 has a first end 70 and a second end 72. The first end 70 is positioned in the arrester assembly 22 abutting the conductive surface 64 of the second electrode 60. The second end 72 is spaced apart from the first end 70 for contact with the cap 30 (FIG. 1). While the illustrated embodiment shows the second end 72 extending through the open mouth 56 of the cup 42, it is envisioned that other forms of the structure could be constructed in which the second end 72 does not extend beyond the open mouth 56 and still makes contact with the cap 30. For example, if the cap 30 is formed with some form of protrusion which extends up to or in through the mouth 56 of the cap 30, the additional extension of the second end 72 beyond the mouth 56 would be unnecessary. As such, the overall length and relative characteristics of the contact 48 should be broadly construed.

The sleeve 44 is constructed with an external surface 74 for creating an interference fit with an inside surface 76 of the cup 42. While a variety of configurations for the external surface 74 may be devised, the present invention shows a plurality of ribs 78 which extend from a wall 80 of the sleeve. The ribs 78 are spaced apart around the external surface 76 to provide a centering effect when the sleeve 44 is inserted through the open end 56 and into a cavity 82 of the cup defined by the wall 50 of the cup 42. The ribs 78 include tapered edges 84 at either end of the rib 78 to facilitate insertion of the sleeve 44 into the cup 42. The sleeve 44 is formed of a temperature resistant plastic which is selected to tolerate elevated temperatures which will result in melting the contact 48 as described hereinbelow.

The sleeve 44 may also be formed with a non-interfering design such that, for example, the external surface 74 fits against the inside surface 76 of the cup 42 without creating a friction or interference fit. In this alternate design, the sleeve 44 may be retained in the cup 42 by slightly deforming the upper rim 54 of the cup 42 radially inwardly to prevent the removal of the sleeve 44 therefrom. Additionally, the sleeve 44 may be retained in the cup 42 by piercing or deforming an outside surface 86 of the cup 42 to force a portion of the cup material in against the external surface 74 of the sleeve 44.

The arrester assembly 22 of the present invention includes an engaging structure 88 for retaining the contact 48 in the sleeve 44. The engaging structure 88 includes at least one protrusion 90 formed on an internal surface 91 of the sleeve 44. At least one projection 92 on the first end 70 of the contact 48 is another component of the engaging structure 88. The protrusion 90 and projection 92 prevent the contact 48 form being removed from the sleeve 44. More specifically, the illustrated embodiment includes a protrusion 90 in the form of an annular ridge 94 disposed or formed on the internal surface 91. The annular ridge 94 radially projects inwardly towards a central axis 96. The projections 92 on the first end 70 of the contact 48 are formed by extensions of the contact 48 which extend away from a central axis 96. As shown in the illustrated embodiment, the contact 48 has an "I-beam" cross-sectional shape. The projections 92 created by the I-beam- shaped contact 48 have an external dimension 98 which is greater than an internal dimension 100 measured at the annular ridge 94. As such, the engaging structure 88 retains the contact 48 in the sleeve 44.

Several of the components of the arrester assembly 22 including the contact 48, sleeve 44, and arrester element 46 are bipolar symmetric structures such that they can be axially arranged and assembled in either polar orientation. This symmetric design helps increase the ease of assembly and essentially eliminates any error in orienting parts during assembly. In this regard, the sleeve 44 includes a first opening 102 and a second opening 104. The inner annular ridge 94 is positioned generally midway between the first and second openings 102, 104 so that the sleeve provides the same function in either orientation. Similarly, the contact 48 is formed with symmetric first and second ends 70, 72 so that the orientation of the contact does not matter during assembly. Additionally, the contact 48 is formed in the I-beam shape to help reduce the costs of manufacture. In this regard, the I-beam shape of the contact 48 can be cut from an extrusion to eliminate the need to cast individual contacts 48 from a solder material. It should be noted, if necessary, a variety of forming techniques may be used to form the contact 48 and a variety of shapes may result which achieve the same or substantially the same function of the present invention. It is appreciated that one of ordinary skill in the art, employing the teachings provided herein, may devise different configurations for the contact 48 which perform substantially the same function, in substantially the same way, to achieve substantially the same result as of the claimed invention.

The method of assembly of the arrester assembly 22 involves the steps of generally providing the components in the broadest description hereinabove. The arrester assembly 22 may be assembled as a subassembly or may be assembled directly into the housing 24 of the line protector 20. When assembling the line protector 20, the line protector housing 24 is inverted with the nests 26 positioned to receive the spring 28 and arrester assembly 22. In the illustrated embodiment, the arrester assembly 22 is positioned with the base 52 positioned against the spring 28. Once the arrester assembly 22 is assembled, as described herein, in the nest 26, the cap 30 is positioned over the second ends 72 and the retaining clip 32 is attached by way of inserting the fingers 34 into the corresponding clip slots 36, 38.

To assemble the arrester assembly 22 the sleeve 44 and arrester element 46 are positioned in the cup 42 as described hereinabove. The sleeve 44 also provides a centering function to center the arrester element 46 within the cup to prevent contact with the wall 50 of the cup 42. The contact 48 is positioned through the open end 56 of the cup and the corresponding first opening 102 of the sleeve. When initially inserting the contact 48, corners 106 of the projections 92 rest on a leading beveled edge 108 of the annular ridge 94. During the assembly process, a force is applied to the second end 72 of the elongated contact 48 to force the corners 106 beyond and/or through the annular ridge 94. The material of the contact 48, being formed of a solder material, is stronger than the material used to form the sleeve 44. Forcing of the corners 106 through or beyond the annular ridge 94 results in a degree of elastic deformation and possibly some plastic deformation of the material forming the annular ridge 94. Even if there may be some degree of plastic deformation, it is not substantial enough to allow for easy removal of the elongated contact 48 from the sleeve. As such, once the elongated contact 48 is positioned in the sleeve 44 beyond the annular ridge 94, the corners 106 positioned in the assembly 22 underneath a trailing edge 110 of the annular ridge 94 retain the contact 48 in assembly.

The illustrated embodiment of the arrester assembly 22 provides the dimension 112 which permits a degree of axial play of the contact 46 relative to the sleeve 44. However, the axial dimension 112 is substantially less than the width dimension 114 of the arrester element 46. Because of the dimensional differences between the axial dimension 112 and the width 114 the arrester element 46 cannot be moved out of position between the base 52 and the first end 70 of the contact 48. This engagement of the arrester element 46 in the assembly 22 assures that conductive contact will be maintained between the first and second electrodes 58, 60, the contact 48, and base 52, respectively. Further, the spring force 40 produced by the action of the spring 28 on the assembly, when assembled in a line protector 20, maintains secure conductive contact between the conductive faces 60, 62 of the arrester element 46, the contact 48, and cup 42.

In use, the arrester assembly 22 of the present invention is positioned in a line protector 20 as generally shown in FIG. 1 and as also shown in the enlarged cross-sectional side elevational views in FIGS. 6–8. As shown in FIGS. 6–8, the arrester assembly 22 is retained in the nest 26 under a spring force 40 provided by the spring 28. As heat develops in the arrester element 46, depending on the degree and intensity of the heat, the solder in the elongated meltable conductive contact 48 will melt and cause the elongated contact 48 to reduce in length providing at least three fail safe mechanisms. As shown in FIG. 7, the solder may melt and flow, due in part to the spring force 40, upwardly around the arrester element 46 bridging the gap and connecting the first and second electrodes 58, 60. In this condition, the molten solder flows over the non-conductive band 68 between the first and second electrodes 58, 60. Molten solder may flow upwardly through or under the band 68 filling and bridging an air gap between the electrodes 58, 60. The solder will also generally flow to contact base 52 of the cup providing conductive contact.

With reference to FIG. 8, the elongated contact 48 has melted but has not flowed upwardly around the arrester element 46 as shown in FIG. 7. However, under this condition the cup 42 acts as the shunt across the arrester element 46 when the contact 48 melts sufficiently to allow the rim 54 to contact the conductive cap 30. A conductive circuit is formed between the cap 30, cup 42, and spring 28. The spring 28, providing the spring force 40 against the cup 42, forces the cup 42 downwardly and deforms the contact 48 as the contact 48 melts. The spring 28 also maintains the cup 42 in contact with the cap 30.

While a preferred embodiment of the present invention is shown and described, it is envisioned that those skilled in the art may devise various modifications and equivalents without departing from the spirit and scope of the appended claims. The invention is not intended to be limited by the foregoing disclosure.

The invention claimed is:

1. An arrester assembly comprising:
 a cup having a conductive surface;
 a sleeve retained in said cup;
 an arrester element having a first electrode and a second electrode, said first electrode being positioned in said sleeve in conductive contact with said cup;
 an elongated meltable conductive contact having a first end abutting said second electrode of said arrester element;
 at least one protrusion extending radially inwardly from an internal surface of said sleeve; and
 at least one projection on said elongated meltable conductive contact extending outwardly from a central axis thereof, the inward extension of said at least one protrusion and the outward extension of said at least one projection preventing said contact from being removed from said sleeve once positioned therein.

2. An arrester assembly as recited in claim 1, further comprising:
 said cup being formed of a conductive material, said cup including a base and at least one wall defining an open end of said cup; and
 said sleeve being a non-conductive structure positioned between said elongated meltable conductive contact and said cup.

3. An arrester assembly as recited in claim 1, said sleeve further comprising:
 at least one rib extending from an outside surface of said sleeve for facilitating an interference fit against an inside surface of said cup.

4. An arrester assembly as recited claim 1, s aid elongated meltable conductive contact and said sleeve being bipolar symmetric structures, said bipolar symmetric structures of s aid elongated contact and said sleeve facilitating reliable and correct assembly of said contact in said sleeve along a central axis of said assembly to facilitate efficient assembly of said arrester assembly and to reduce errors in the assembly thereof.

5. An arrester assembly as recited in claim 1, wherein said at least one protrusion defines an annular ridge on said internal surface of said sleeve, an internal dimension of said annular ridge being less than an external dimension of said contact measured at said at least one projection.

6. An arrester assembly as recited in claim 1, wherein said elongated meltable conductive contact includes as least two spaced apart projections formed on said first end, said projections having an external dimension measured therebetween which is greater than an internal dimension of said at least one protrusion on said sleeve, said dimensional difference providing a retaining fit of said contact in said sleeve.

7. An arrester assembly as recited in claim 1, wherein said at least one protrusion defines an annular ridge on an internal surface of said sleeve extending generally radially inwardly from said internal surface of said sleeve, said elongated contact having at least two spaced apart projections on said first end, an internal diameter of said annular ridge being less than an external dimension of said pair of spaced apart projections, said dimensional difference preventing removal of said elongated contact from said sleeve.

8. An arrester assembly as recited in claim 1, wherein said sleeve is non-conductive, wherein said elongated contact has a conductive surface on said first end for abutting said second electrode of said arrester element and a conductive surface on said second end, wherein at least a portion of said protrusion of said sleeve is formed of a material which is forcibly deformable by said projection, and wherein application of force to said elongated contact positioned in said sleeve deforms said protrusion for positioning said contact in said sleeve.

9. A line protector comprising:

a housing, said housing defining a nest therein, an arrester assembly retained in said nest of said housing;

a biasing structure positioned between said housing and said arrester assembly for providing biasing of said arrester assembly in said nest;

a cap structure attached to said housing for retaining said arrester assembly in said nest;

said arrester assembly including a cup, a sleeve retained in said cup, an arrester element retained in said sleeve, and an elongated meltable conductive contact retained in said sleeve, at least one protrusion extending radially inwardly from an internal surface of said sleeve, at least one projection on said elongated meltable conductive contact extending outwardly from a central axis thereof the inward extension of said at least one protrusion and the outward extension of said at least one projection preventing said contact from being removed from said sleeve once positioned therein, said arrester element being positioned proximate to said contact with said biasing structure positioned proximate to one of said arrester element and said contact for providing biasing forces there against, the other of said arrester element and said contact being positioned against said cap, whereby said arrester assembly is retained in a compressive condition between said biasing structure and said cap.

10. A line protector as recited in claim 9, further comprising:

said cup being oriented in said nest with an open end thereof positioned proximate to said cap, said elongated contact extending from said cup through said open end and abutting said cap, a base of said cup spaced apart from said open end being positioned proximate to said biasing structure.

11. A line protector as recited in claim 9, said arrester assembly further comprising:

said cup having a conductive structure;

said arrester element having a first electrode and a second electrode, said first electrode being positioned in said sleeve or conductively contacting said cup;

said elongated meltable conductive contact having a first end abutting said second electrode of said arrester element.

12. A protector as recited in claim 11, said arrester assembly further comprising:

at least one rib extending from an outside surface of said sleeve for facilitating an interference fit against an inside surface of said cup.

13. A method of assembling an arrester assembly comprising the steps of:

providing a cup, a sleeve, an arrester element, and an elongated meltable conductive contact, said sleeve having an external surface for providing an interference fit with an inside surface of said cup, an internal surface of said sleeve having at least one protrusion extending inwardly from said internal surface, and said contact having at least one projection thereon, an internal dimension of said sleeve at said protrusion being less than an external dimension of said contact at said projection;

positioning said cup with an open end thereof for receiving said sleeve, said arrester element, and said contact;

positioning said sleeve in said open end of said cup;

applying a force to said sleeve to position said sleeve in said cup;

positioning said arrester element in said sleeve;

positioning a first end of said contact in said sleeve; and applying a force on a second end of said contact spaced away from said first end for forcing said projection through said protrusion;

whereby dimensional differences between said projection and said protrusion retain said contact in said sleeve with said arrester element positioned between said first end of said contact and said cup.

14. An arrester assembly comprising:

a cup having at least one wall and a base, said wall defining an open end of said cup;

a hollow sleeve having at least one wall defining a first opening and a second opening at opposite ends thereof, said sleeve being sized and dimensioned with an external surface thereof producing an interference fit with an inside surface of said cup, an internal surface of said sleeve having at least one protrusion thereon extending inwardly from the internal surface;

an arrester element having a first electrode and a second electrode, said arrester element being sized and dimensioned to fit inside said sleeve, said arrester element being positioned in said cup with said first electrode abutting a conductive surface of said cup;

an elongated meltable conductive contact having a first end abutting said second electrode of said arrester element and a second end spaced from said first end, at least one projection on said first end of said contact;

an internal dimension of said sleeve measured at said at least one protrusion being less than an external dimension of said contact measured at said at least one projection for providing a dimensional difference therebetween to retain said contact in said sleeve once assembled therewith.

15. An arrester assembly as recited in claim 14, further comprising:

said cup being formed of a conductive material;

said sleeve being formed of a non-conductive material for providing an insulating effect between said elongated meltable conductive contact and said cup; and at least one rib extending from an outside surface of said sleeve for facilitating an interference fit against an inside surface of said cup.

16. An arrester assembly as recited in claim 14, wherein said at least one protrusion defines an annular ridge on said internal surface of said sleeve, an internal dimension of said annular ridge being less than an external dimension of said contact measured at said projection.

17. An arrester assembly as recited in claim 14, wherein said elongated meltable conductive contact includes as least two spaced apart projections formed on said first end, said projections having an external dimension measured therebetween which is greater than an internal dimension of said at least one protrusion on said sleeve, said dimensional difference providing retaining fit of said contact in said sleeve.

18. An arrester assembly as recited in claim 14, wherein said at least one protrusion defines an annular ridge on an internal surface of said sleeve extending generally radially inwardly from said internal surface of said sleeve, said elongated contact having at least two spaced apart projections on said first end, an internal diameter of said annular ridge being less than an external dimension of said pair of spaced apart projections, said dimensional difference preventing removal of said elongated contact from said sleeve.

19. An arrester assembly as recited is claim 14, said elongated meltable conductive contact and said sleeve being bipolar symmetric structures, said bipolar symmetric structures of said elongated contact and said sleeve facilitating reliable and correct assembly of said contact in said sleeve along a central axis of said assembly to facilitate efficient assembly of said arrester assembly and to reduce errors in the assembly thereof.

20. A line protector comprising: a housing, said housing defining a nest therein, an arrester assembly retained in said nest of said housing; a biasing structure positioned between said housing and said arrester assembly for providing biasing of said arrester assembly in said nest; a cap structure attached to said housing for retaining said arrester assembly in said nest; said arrester assembly including a cup, a sleeve retained in said cup, an arrester element retained in said sleeve, and an elongated meltable conductive contact retained against said sleeve, at least one rib extending from an outside surface of said sleeve for facilitating an interference fit against an inside surface of said cup, a protrusion extending radially inwardly from an internal surface of said sleeve, a projection on said contact extending outwardly from a central axis thereof, the inward extension of said protrusion and the outward extension of said projection preventing said contact from being removed from said sleeve once positioned therein, said arrester element being positioned proximate to said contact with said biasing structure positioned proximate to one of said arrester element and said contact for providing biasing forces there against, the other of said arrester element and said contact being positioned against said cap, whereby said arrester assembly is retained in a compressive condition between said biasing structure and said cap, said cup having a conductive structure, said arrester element having a first electrode and a second electrode, said first electrode being positioned in said sleeve or conductively contacting said cup, said elongated meltable conductive contact having a first end abutting said second electrode of said arrester element.

* * * * *